United States Patent Office 3,434,183
Patented Mar. 25, 1969

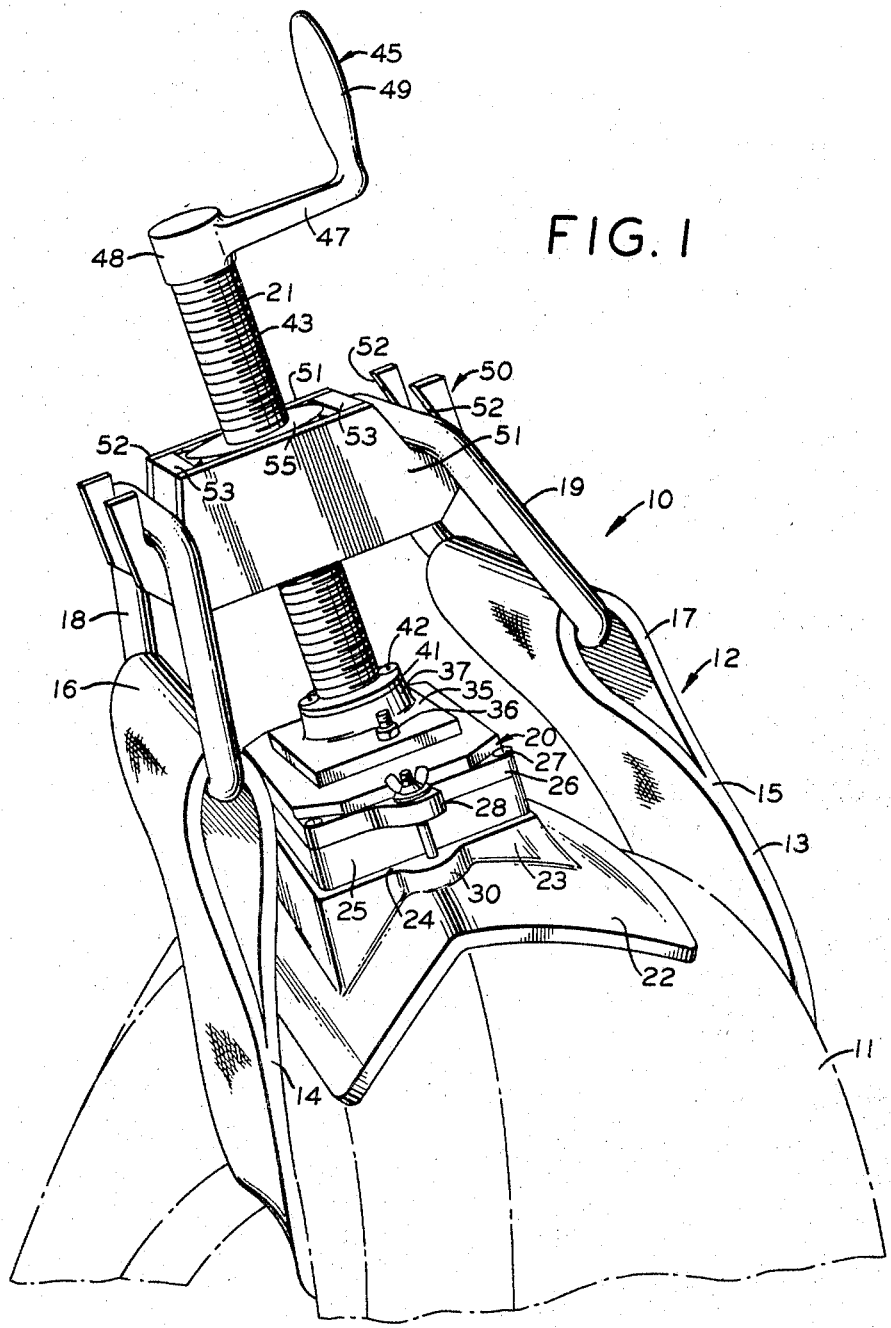

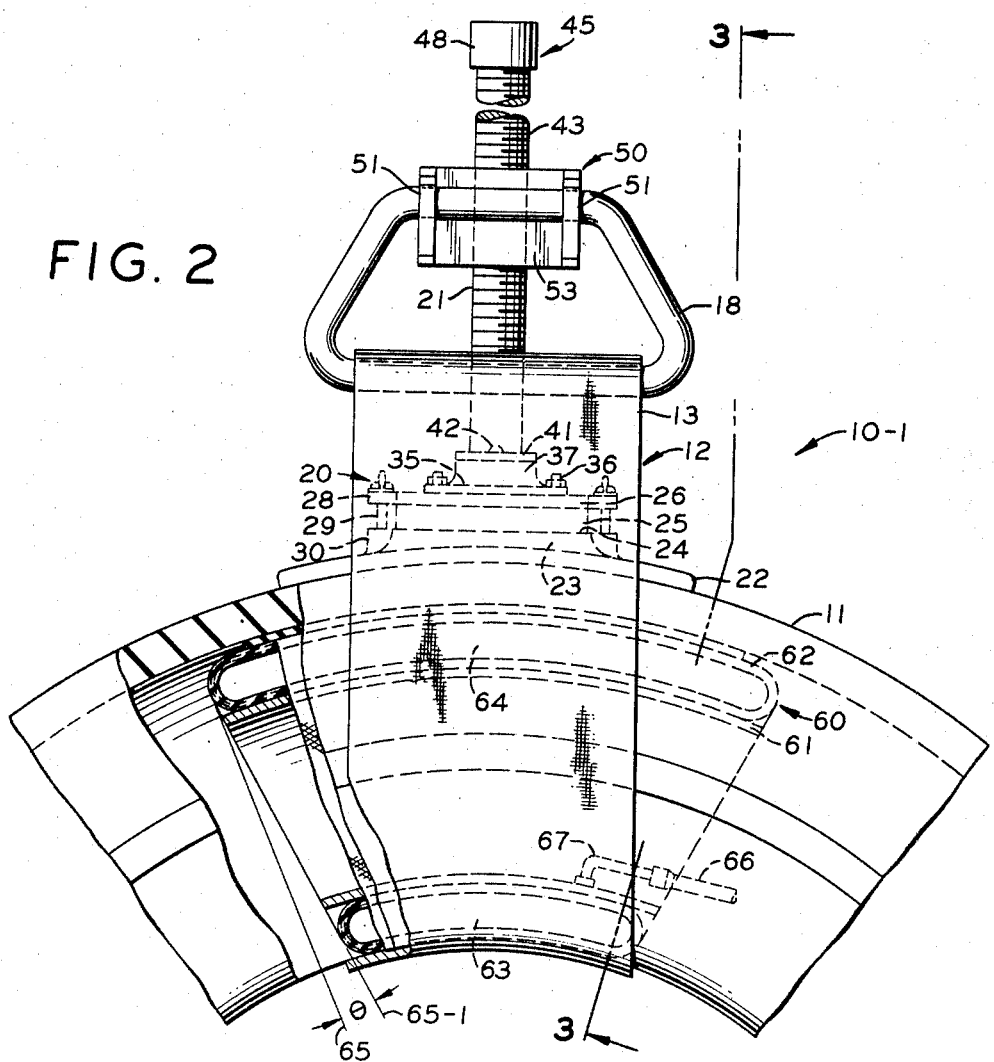
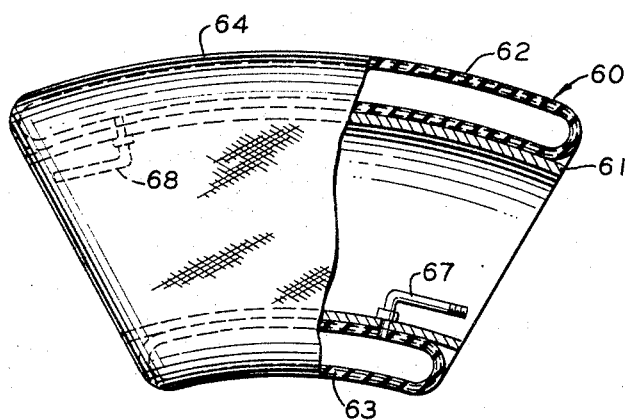

---

3,434,183
PORTABLE TIRE REPAIR DEVICE
Joseph P. Kaenan, Akron, Ohio, assignor to Patch
Rubber Company, Akron, Ohio, a corporation of
Ohio
Filed Sept. 29, 1964, Ser. No. 400,006
Int. Cl. B29h *17/00*
U.S. Cl. 18—45                           1 Claim

ABSTRACT OF THE DISCLOSURE

A portable tire patch pressurizing device for applying heat and pressure to a section of a tire to effectuate repair. A clamping device encircles a portion of a tire to be repaired and provides suitable circumferential adjustment for the selective application of pressure and heat. The tire is prevented from internal deformation by a pressure bag assembly inserted under the clamping device and having an arcuate tubular member surrounded by an inflatable annular bladder which contacts the inside of the tire and which has the circumferential extremities of its radially inner portion undercut from radial alignment with the circumferential extremities of the radially outer portion to reduce forces tending to wrinkle the tire during inflation.

---

The present invention relates to a tire patch pressurizing device. More particularly, the invention relates to a portable device for selectively applying pressure and heat to a section of a tire to effectuate repair. Specifically, the invention relates to a portable tire patching device which internally and externally contacts a tire to allow selective application of heat and pressure.

In repairing tire casings, it is necessary to vulcanize the uncured rubber in a repair patch to bond the patch to the adjacent portions of the tire and give it comparable physical characteristics. Vulcanizing or tire repair bags or bladders have been used for some time to hold a tire extended in firm contact with a mold or form during the vulcanizing operation. The bag or bladder is inflated to subject the tire to the desired pressure while suitable heat is supplied through the bag or mold. In the past, the forms or molds have been large stationary cavity shells or matrix segments adapted to receive the exterior surface of a particular size tire.

One of the reasons for the use of large stationary matrix or mold sections in prior devices has been to preclude distortion of the tire during inflation of the sectional airbag or bladder. Heretofore, when a relatively small mold or form has been employed, inflation of the arcuate shaped bladder caused the walls to radially distend while, at the same time, the bag exhibited an undesirable tendency to straighten out or assume a linear shape. This straightening imparts compression forces in the side walls of a tire which result in radical wrinkles or ripples which are vulcanized in, thereby producing a defective tire.

The use of large molds or forms supporting a sizeable section of the tire provides a partial solution to this problem. Additionally, other devices have been employed to strengthen the bladder by increasing the wall thickness or incorporating longitudinal supports or braces. However, these devices have proven only partially satisfactory and necessitate additional material and the attendant expense.

Accordingly, an object of the present invention is to provide an improved tire patch pressurizing device having a relatively small mold or shaping platen which is highly portable.

Another object of the invention is to provide a pressurizing device which will not form wrinkles or ripples in the side wall of the tire being repaired.

A further object of the invention is to provide an arcuate tire repair bladder or bag having a reduced tendency to straighten beyond the normal curvature of the tire.

An additional object of the invention is to provide a tire pressurizing device having molds or shaping platens which can be easily interchanged to accommodate different tire sizes.

Another object of the invention is to provide a tire pressurizing device having interchangeable molds or shaping platens for the localized application of pressure to the tread, shoulder, or side walls of a tire casing.

Still another object of the invention is to provide a tire patch pressurizing device which is small, inexpensive, and represents an improvement over previously known devices.

Various other objects and advantages will appear from the following description taken in conjunction with the attached drawings, and the novel features will be particularly pointed out hereinafter in connection with the appended claims.

In the drawings:

FIG. 1 is a view, in linear perspective, of the tire patch pressurizing device according to the invention completely assembled and attached in the shoulder contact position to an exemplary tire casing.

FIG. 2 is a side elevation of the tire patch pressurizing device completely assembled in the thread contact position with portions of the strap and tire broken away to show the bag or bladder.

FIG. 4 is a side elevation of the tire patch pressurizing bag or bladder and supporting structure substantially as depicted in FIGS. 2 and 3 with a portion of the bag broken away.

Figure 3:
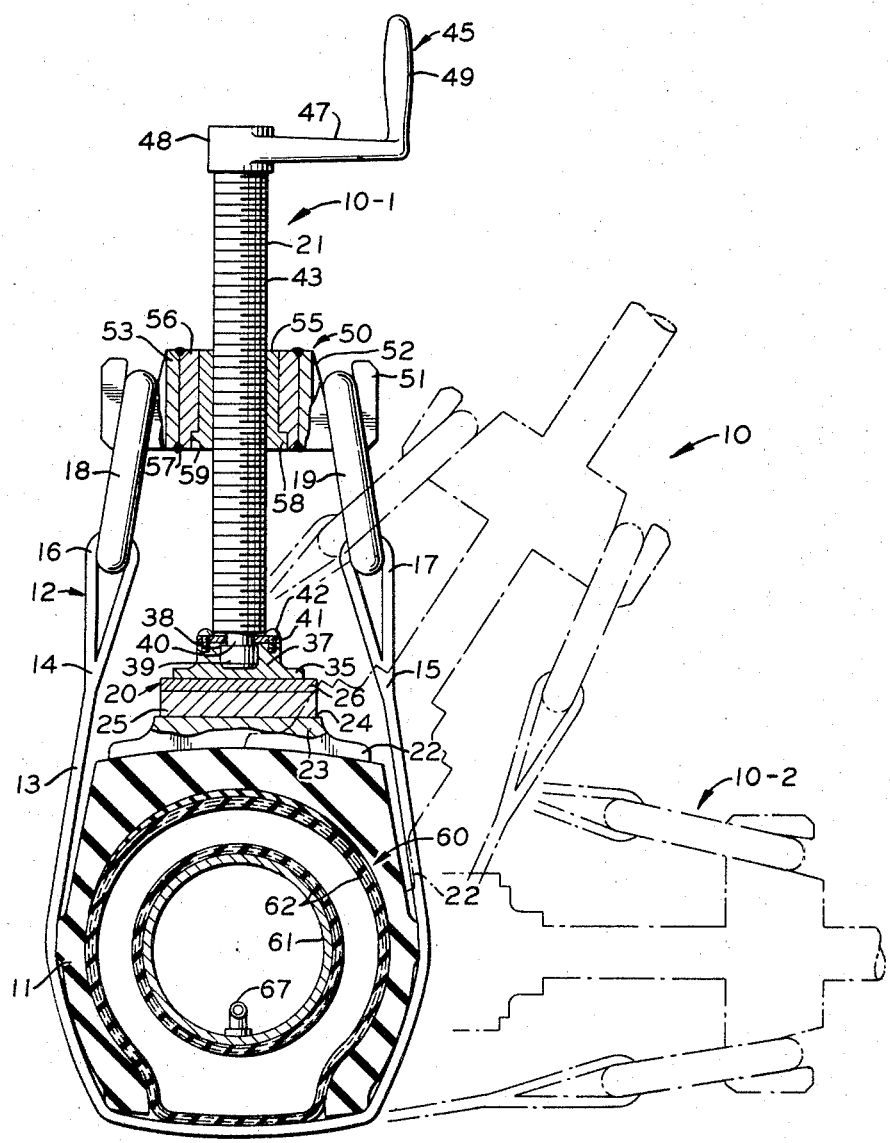
FIG. 3 is a section of the tire patch pressurizing device and a tire taken substantially as indicated on line 3—3 of FIG. 2 with alternate contact positions of the device shown in phantom lines.

The tire patch pressurizing device, generally indicated by the numeral 10 in FIG. 1, is adapted for conformance with a variety of tire sizes and is small enough to be readily portable. The pressurizing device 10 is held in place in an appropriate position on the tire 11 by a clamping or retaining device, generally indicated by the numeral 12.

The clamping or retaining device 12 has a strap or belt 13 which extends through the center of the tire 11 and substantially encases it. The strap 13 may be constructed of any suitable fabric, elastomer, or reinforced elastomer having the requisite tensile strength and elongation properties. Both ends of the strap 13 are turned back and attached by bonding, clamping, or vulcanization at 14 and 15 to form the retaining loops 16 and 17. The retaining loops 16, 17 extend through and seat at the bases of trapezoidal or other appropriately shaped polygonal connector rings 18 and 19, which preferably are of circular cross section to avoid unnecessary abrading of retaining loops 16, 17.

The clamping device 12 also has a base portion, generally indicated by the numeral 20, which seats on the tire 11 and has a projecting shaft 21. The base 20 has a tire shaping platen 22 having one surface in direct contact with the outer periphery of the tire 11, as seen in FIGS. 1, 2, and 3. The upper surface of the platen 22 has a raised portion 23 which terminates in a flat rectangular surface 24. A heating platen 25 in the form of a rectangular block is seated on the rectangular surface 24 of shaping platen 22. The heating platen 25 may be of the steam type with suitable ducting and connections or the electrical type with appropriate resistance elements, depending upon the particular requirements of individual applications.

A generally rectangular base block 26 attached to the upper surface of the heating platen 25 retains and positions both the heating platen 25 and the shaping platen 22. Suitable threaded fasteners 27, seen in FIG. 1, extend through base block 26 into the heating platen 25, allowing selective removal and replacement. Outwardly projecting arcuate embossments 28 with suitable bores extend from the sides of base block 26 and receive threaded fasteners 29 which are embedded in similar arcuate projections 30 formed in the upper surface of shaping platen 22. Therefore, different shaping platens may be substituted for different tire sizes to prevent contour distortion caused by the differences in the curvature of the outer periphery of tires. Additionally, different shaping platens 22 are employed depending upon whether the repair area is the tread, shoulder, or side wall of the tire. FIGS. 1 and 3 show the pressurizing device 10 in the shoulder position with a longitudinally curved and transversely angled shaping platen 22. FIGS. 2 and 3 depict the pressurizing device in the tread position, designated as 10-1, with suitable longitudinal and transverse curvature of the shaping platen. The side wall position of the pressurizing device, designated 10-2, is shown in phantom lines in FIG. 3.

Referring again to FIGS. 1-3, the base block 26 has a generally rectangular support block 35 secured to its upper surface by suitable fasteners 36. The upper portion of the support block 35 tapers to form a cylindrical receiver 37 having an axial bore 38 therein. The shaft 21 has a reduced diameter head 39 at its lower extremity which matingly engages the axial bore 38, allowing free rotation of the shaft. Just above the head 39 of shaft 21 in the portion projecting beyond receiver 37 is a narrow groove or recess 40 having a diameter less than that of the head 39. A thrust collar 41 having an inner diameter corresponding to that of the narrow groove or recess 40 is seated atop the receiver 37 and rigidly attached thereto by fasteners 42, thereby preventing axial displacement of the shaft 21 (see FIG. 3).

The body of shaft 21 has threads 43 covering a substantial portion of its length and a handle, generally indicated by the numeral 45, at its upper extremity to facilitate controlled rotation of shaft 21. The handle consists of a radial lever arm 47 projecting from a hub 48 which is nonrotatably attached to the shaft 21. An axial gripping arm 49 is attached at the outer extremity of the lever arm 47 for the convenience of the operator.

The shaft 21 also supports a movable yoke, generally indicated by the numeral 50, which can be selectively linearly positioned along the threaded portion 43. The movable yoke 50 has side panels 51 with slots 52 extending downwardly and outwardly near either end of the top surface to form cradle-like supports. Side panels 51 are spaced and rigidly joined by the end panels 53 which abut the inner edges of the slots 52. The core of yoke 50 is a generally cylindrically shaped bushing 55 which is internally threaded to matingly engage the threads 43 of shaft 21. The bushing 55 is nonrotatably mounted in the yoke 50 by the use of one or more keys 56 which are attached to the side panels 51 or end panels 53, as by the welds 57. To ensure that the side panels 51 are not displaced downwardly from the bushing 55 when the slots 52 are loaded, the bushing 55 may be provided with a small shoulder 58 which seats in a notch 59 in key 56.

While the exterior surface of the tire 11 is held by the clamping or retaining device 12, the interior surface is shaped by the pressure bag assembly, generally indicated by the numeral 60 in FIGS. 2, 3, and 4. A substantially rigid, arcuate tube 61 provides the basic form and shape for the pressure bag assembly 60. The arcuate tube 61 is exteriorly enclosed and surrounded by an inflatable annular bladder or bag 62 which contacts the interior surface of the tire 11. Alternatively, in large diameter tires, the tube 61 may be linear with the annular bag 62 having suitable exterior curvature for conformance with the interior surface of the tire 11. The annular bag 62 is preferably constructed of several plies of material to provide the necessary strength while maintaining a sufficiently thin overall thickness to preclude unnecessary wear during repeated inflation and deflation. A four ply bag of rayon cord construction having cords of successive plies angularly oriented 0° to 45° has been found satisfactory to meet these objectives and provide an adequate service life. Although the annular bag 62 may be cemented or otherwise bonded or secured to the arcuate tube 61, the natural constriction from vulcanization of the bag after assembly has proven sufficient to permanently secure the bag 62, even during repeated use. Alternatively, the bag may be used without a core, or a smaller core may be inserted after the bag is positioned in the tire.

A significant feature of the present construction is that the circumferential extremities of the interior portion 63 of the annular bag 62 are not radially aligned with the circumferential extremities of the exterior portion 64. This feature can be best seen in FIG. 2, wherein the line 65 represents a radial orientation from the circumferential extremity of the exterior portion 64 of the annular bag 62. The line 65-1 depicts the actual alignment employed, revealing an undercut of the interior portion 63 of a predetermined angle $\theta$. This undercut accomplishes the above-stated object of preventing the formation and subsequent vulcanization of wrinkles or ripples in the side walls of tires, caused by compression forces imparted by the tendency of the bladder to straighten out upon inflation. The reduced dimension of the interior portion 63 compensates for the straightening tendency, thereby maintaining the bladder in its desired arcuate shape substantially conforming to the tire curvature. Although any undercut angle $\theta$ up to forty-five degrees appears to be advantageous, it has been empirically determined that approximately fifteen degrees achieves optimum results.

The annular bag or bladder 62 is inflated in the above described manner from a pressurized air or steam source (not shown). The inflation fluid is conducted through a connector tube 66 into an L-shaped input tube 67 which penetrates the arcuate tube 61 and empties into the annular bag 62. Normally, when the heating platen 25 employs steam, the same steam source can be used as a fluid supply for the bag 62. However, when the heating platen 25 is electric, the inflation fluid may be either steam or air. In some installations where two inlets or an inlet and an outlet are desirable, a second input tube 68 may be appropriately installed.

In the operation of the tire patch pressurizing device, the pressure bag assembly 60 is initially inserted in the tire at the area to be patched in an uninflated state. The strap or belt 13 of the clamping device 12 is then inserted through the center of the tire 11, and the trapezoidal connectors 18 and 19 are attached to the cradle like slots 52 of the movable yoke 50. Since the rotation of the yoke 50 is restricted by the strap 13, rotation of the handle 45 linearly displaces the yoke 50 along the shaft 21, thereby applying the desired exterior pressure to the tire 11 through the shaping platen 22. The application of interior pressure and heat to the tire area to be repaired are fully described in the preceding description.

A preferred form of the invention has been shown and described in sufficient detail to enable one skilled in the art to practice the invention. Since various modifications in details, materials, and arrangements of parts are within the spirit of the invention herein disclosed and described, the scope of the invention should be limited solely by the scope of the attached claim.

What is claimed is:

1. A tire repair vulcanizing bag comprising, an arcuate tube, an inflatable bladder exteriorly encasing said arcuate tube and shaped for conformance with the interior surface of a tire casing, said inflatable bladder having the circumferential extremities of its radially inner portion undercut at an angle of approximately 15° from radial alignment with the circumferential extremities of the radially outer portion.

References Cited

UNITED STATES PATENTS

| | | | |
|---|---|---|---|
| 836,083 | 11/1906 | Bowley. | |
| 1,628,304 | 5/1927 | Burdette | 18—45 |
| 2,063,069 | 12/1936 | Wheelock | 18—18 |
| 2,331,087 | 10/1943 | Warman | 18—45 |
| 2,814,073 | 11/1957 | Van Scoyk | 18—18 |

FOREIGN PATENTS

| | | |
|---|---|---|
| 186,618 | 9/1922 | Great Britain. |
| 468,608 | 11/1928 | Germany. |

J. HOWARD FLINT, Jr., *Primary Examiner.*

U.S. Cl. X.R.

18—18